United States Patent [19]

Berger

[11] 4,006,873
[45] Feb. 8, 1977

[54] SPRING SUPPORT
[75] Inventor: Peter Berger, Pforzheim, Germany
[73] Assignee: Metallschlauch-Fabrik Pforzheim (vorm. Hch. Witzenmann) Gesellschaft mit beschrankter Haftung, Pforzheim, Germany
[22] Filed: Apr. 11, 1975
[21] Appl. No.: 567,085
[30] Foreign Application Priority Data
Apr. 11, 1974 Germany ............................ 2417728
[52] U.S. Cl. .............................. 248/54 CS; 248/58; 267/173; 267/178
[51] Int. Cl.² .......................................... F16L 3/00
[58] Field of Search ............... 248/54 CS, 54 R, 58, 248/18; 267/70, 173, 178

[56] References Cited
UNITED STATES PATENTS

| 2,395,730 | 2/1946 | Farkas | 248/54 CS |
| 2,867,399 | 1/1959 | Alexeff | 248/54 CS |
| 2,946,547 | 7/1960 | Grabe | 248/54 CS |
| 3,552,695 | 1/1971 | Liesegang | 248/54 CS |
| 3,588,010 | 6/1971 | Liesegang | 248/54 CS |

FOREIGN PATENTS OR APPLICATIONS

1,203,065 10/1965 Germany ............................ 248/58
693,279 8/1965 Italy .............................. 248/54 CS Primary Examiner—Roy D. Frazier
Assistant Examiner—Rodney H. Bonck
Attorney, Agent, or Firm—Spencer & Kaye

[57] ABSTRACT

A spring support device has a housing; a coil spring having one end supported in the housing and another end carrying a spring disc; at least two bell crank levers arranged on the spring disc symmetrically to the coil spring; and a fulcrum slidably and pivotally supporting each bell crank lever on the spring disc. Each bell crank lever has a first arm extending from the fulcrum generally parallel to a radial plane of the coil spring and each bell crank lever has a second arm extending from the fulcrum at an angle to the first arm. The first and second arms have an end remote from the fulcrum. A pull rod has one end adapted to carry a load and another end at least indirectly articulated to the end of each first arm. The spring support device further comprises a mechanism for guiding the end of each second arm in a stationary, arcuate path oriented generally parallel to an axial plane of the coil spring.

14 Claims, 9 Drawing Figures

SPRING SUPPORT

BACKGROUND OF THE INVENTION

This invention relates to a spring support device for pipes, boilers or other structures exposed to heat. The spring support is of the type which exerts an essentially constant support force as the load is vertically shifted. The spring support has a load-carrying pull rod which is engaged by at least two identically structured and symmetrically arranged bell crank levers. The latter are articulated to the pull rod at the end of their generally radially extending arm. The load exerted on the pull rod is supported by a spring through the intermediary of the bell crank levers and a spring disc. The spring which is, in turn, held at its other end by a stationary support is constituted by at least one compression spring which is arranged essentially parallel to, or coaxial with, the pull rod. The bell crank levers are in engagement with the spring disc or similar component in a slidable manner, for example, by means of a roller carried by each bell crank lever.

A spring support of the above-noted type which essentially may be used for suspending a load therefrom or placing a load thereon, is disclosed in German Published Accepted Patent Application No. 1,291,581. The other, external ends of the bell crank levers are articulated to essentially vertically oriented tension bars which are attached to a pressure beam constituting a fixed support for the spring system. In such a structure, during vertical motion of the pull rod and thus, during the pivotal motion of the bell crank levers, the arm advantages vary between the outer end and the slidable support on the one hand, and the slidable support and the inner end, on the other hand, whereby a change in the reaction force of the spring system is compensated in a large measure. Spatial requirements are relatively large in the direction of the bell crank levers because of their required length and thus it is practically indispensable to arrange a plurality of compression springs side-by-side along this direction. Further, the above-outlined known structure delivers an approximately constant support force only over a relatively small setting range of the pull rod.

Further, in German Patent No. 1,203,065 there is disclosed a spring support which operates with three springs of identical dimension. One spring is oriented vertically, whereas the two other springs are disposed laterally swingably and, in the neutral position of the spring support, in which they are oriented horizontally, they do not exert any force. In all the other positions, the two lateral springs correct, by means of the force components oriented in the direction of the rod, the force of the vertical springs varying with the displacement of the rod. In this manner there is obtained a practically constant support force for the load so that in case of a heat expansion-caused vertical change of position, no additional transversal force or decreased support force will be exerted on the load. In this structure again, the lateral springs require in their direction, substantial structural space and further, the use of at least three springs is necessary.

Further, there are known spring supports in which the support force remains constant in a large measure and which, in essence, require the use of only a sole compression spring. The spring is oriented substantially horizontally adjacent the path of the pull rod and is connected therewith by means of a toggle joint which is so dimensioned that there is obtained a substantially constant support force throughout the permissible rod path. Such an asymmetrical construction, however, leads to a laterally projecting structure and it is necessary to design the spring, corresponding to the ratio of the arms of the toggle joint, stronger than it would otherwise be necessary for carrying the load. Further, the permissible rod path is significantly limited.

SUMMARY OF THE INVENTION

It is an object of the invention to provide an improved spring support of the afore-outlined type which utilizes a sole vertically oriented compression spring and thus has a compact structure without adversely affecting a constant support force that could be achieved heretofore throughout the permissible pull rod path.

It is a further object of the invention to provide an improved spring support of the above-outlined type in which, throughout a comparable pull rod path, there is obtained an absolutely constant support force.

It is still another object of the invention to provide an improved spring support of the above-outlined type which has a simplified structure resulting in decreased manufacturing costs.

These objects and others to become apparent as the specification progresses, are accomplished by the invention, according to which, briefly stated, the axially extending arm of each bell crank lever is guided for pivotal motion in a substantially vertically oriented track.

The invention makes it possible to arrange the bell crank levers and the tracks above a spring support disc but inside of the radial section of a conventional compression spring within a spring support housing. Expediently, the housing serves as an abutment for the spring system and stationarily accommodates the above-outlined tracks. In this manner, there is obtained an essentially cylindrical structural unit, the radial dimension of which practically corresponds to the radial cross section of the compression spring. The axial dimension of the structural unit, on the other hand, exceeds the axial length of the compression spring only to such an extent as described above in connection with known spring suspension means.

It has been found to be expedient to provide that the other arm of the bell crank levers, that is, the arm which is arranged at an angle to the arm engaging the spring disc, is oriented essentially in the vertical direction in the neutral position of the spring support, whereby the above-described effects are further enhanced.

According to an embodiment of the invention, the other arms of the bell crank levers are articulated to stationarily and pivotally supported pivotal levers which, in the neutral position of the spring support, are oriented horizontally. In this manner, the spring support can, in its neutral position, be set to the nominal load value by appropriate adjustment of the bias of the compression spring. In this position, the pivotal levers can exert no vertical force; stated differently, they are neutralized in their effect. If now there occurs a vertical excursion of the spring support, the pivotal levers assume, to a greater or lesser extent, an inclined position in which the support force exerted by the pivotal levers on the bell crank levers has a vertical component which is proportionate to the sine of the angle of deflection.

This vertical component compensates for the spring force alteration caused by the excursion, so that, as a result, the support force exerted on the pull rod remains practically constant.

The magnitude of error introduced by the pull rod displacement can be maintained at a small value by selecting relatively large the vertical distance between the pivotal connection of the bell crank levers with the pivotal levers and the support point of the bell crank levers on the spring disc.

According to a further embodiment of the invention, the other arm of the bell crank levers are provided each with at least one laterally extending pin or the like (which may be bearing-supported) which are guided in a slot track supported in a stationary manner in the housing. This groove or slot track which may be provided by a milling operation in plate members which are vertically and radially affixed in the housing, causes the axially extending arms of the bell crank levers to execute, during the excursion of the pull rod, a motion which may be determined between very wide limits and which may be designed based on computations for ensuring that the spring support operates error-free even through a very large excursion of the pull rod. By comparing this embodiment with that outlined above, the track in this second embodiment may be so designed as to correspond to a pivotal lever, the length of which varies in a stepless manner as the position of the pull rod changes.

In both embodiments outlined above it may be of additional advantage to provide that the bell crank levers, at the end of their generally horizontally extending arm, engage an axially effective and radially extending curved track of the spring disc or the like. In this manner, compared with a radially planar spring disc, the ratio between pull rod excursion and spring displacement may be affected or changed in the positive or negative direction, so that, for example, a comparatively much smaller spring displacement and thus a corresponding smaller alteration of the spring force may be obtained throughout the pull rod path.

The invention and all conceivable embodiments thereof are based on the common principle to move the bell crank levers together with the pull rod and spring displacement and, at the same time, vary the direction of the support force exerted on the other end of the bell crank levers. In this manner, there is obtained a greater or lesser vertical component which compensates for the alteration of the spring force.

DESCRIPTION OF THE PREFERRED EMBODIMENTS

Turning to FIGS. 1–4, the spring support has a housing 1 in which a compression (coil) spring 2 is coaxially supported by a bottom 4 which is adjustable by means of screws 3 for varying the spring bias. The compression spring 2 carries a spring disc 5 which is centered on the compression spring 2 by means of a collar 6 affixed to the spring disc 5.

On the spring disc there are supported identical and aligned bell crank levers 7 and 8 which engage the spring disc 5 by means of fulcrum rollers 9 and 10 situated at the lever angles. The radial ends of the bell crank levers 7 and 8 are connected to a common pull rod 11 which, upon longitudinal displacement, causes pivotal motions of the bell crank levers 7 and 8. To the end of the pull rod 11 which is remote from its connection with the bell crank levers 7 and 8 there may be attached, in a manner not shown, a load, such as a pipe. The substantially axially oriented arms of the bell crank levers 7 and 8 are rotatably connected with pivotal levers 12 and 13 which, in turn, are articulated at 14 and 15, respectively, to the housing 1.

The entire spring support is suspended by an eyelet 16 from a stationary support.

Figure 1:
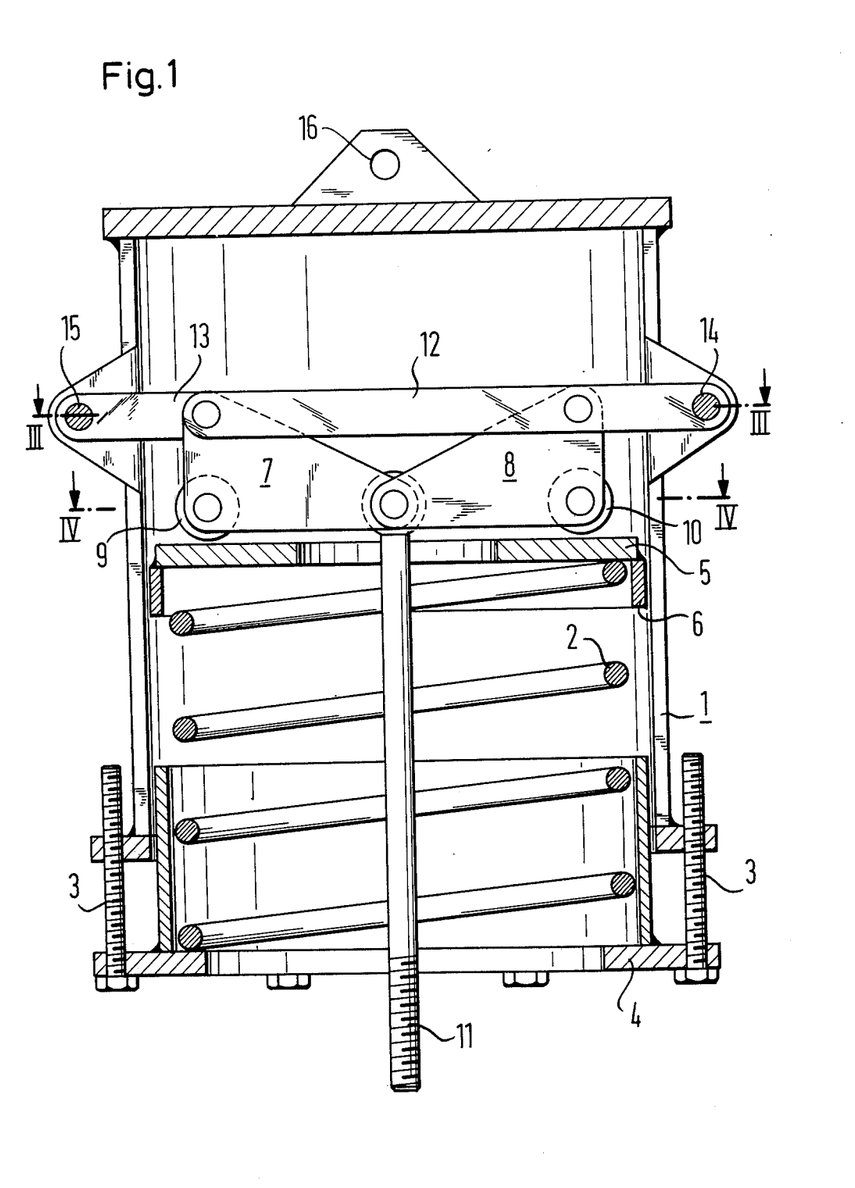
FIG. 1 is an axial sectional view of a preferred embodiment of the invention.
Figure 2:
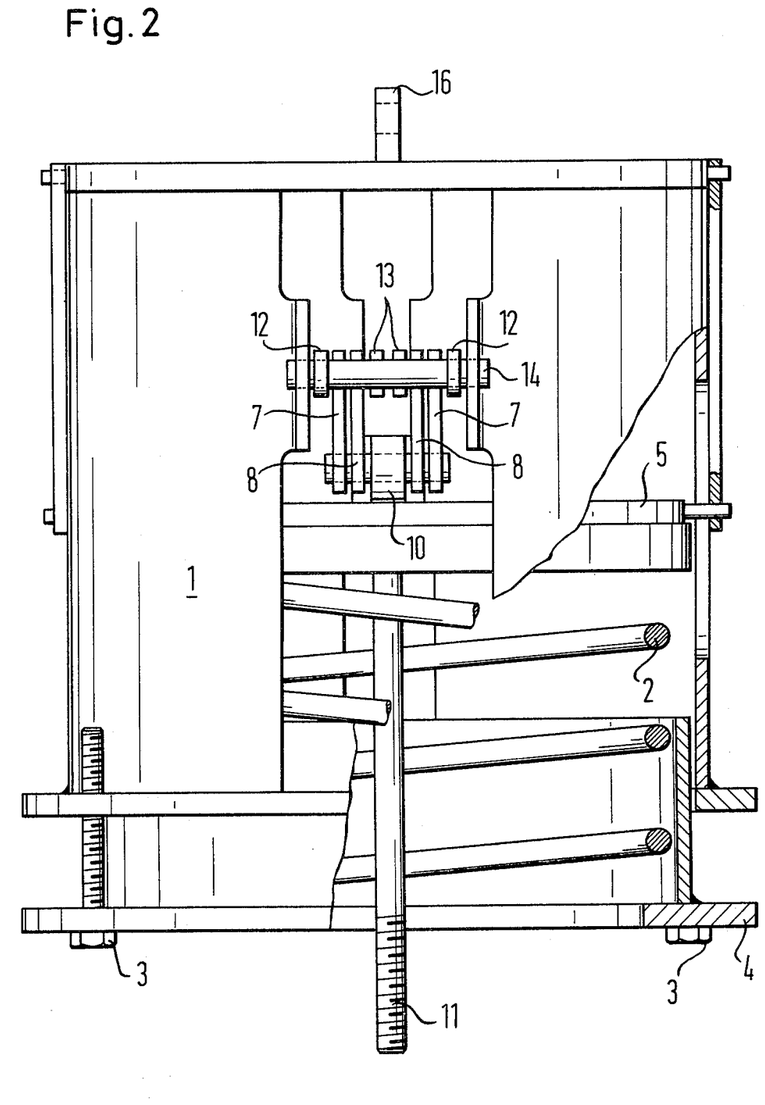
FIG. 2 is an axial sectional view of the same embodiment taken in a plane disposed 90° to the plane of FIG. 1.
Figure 3:
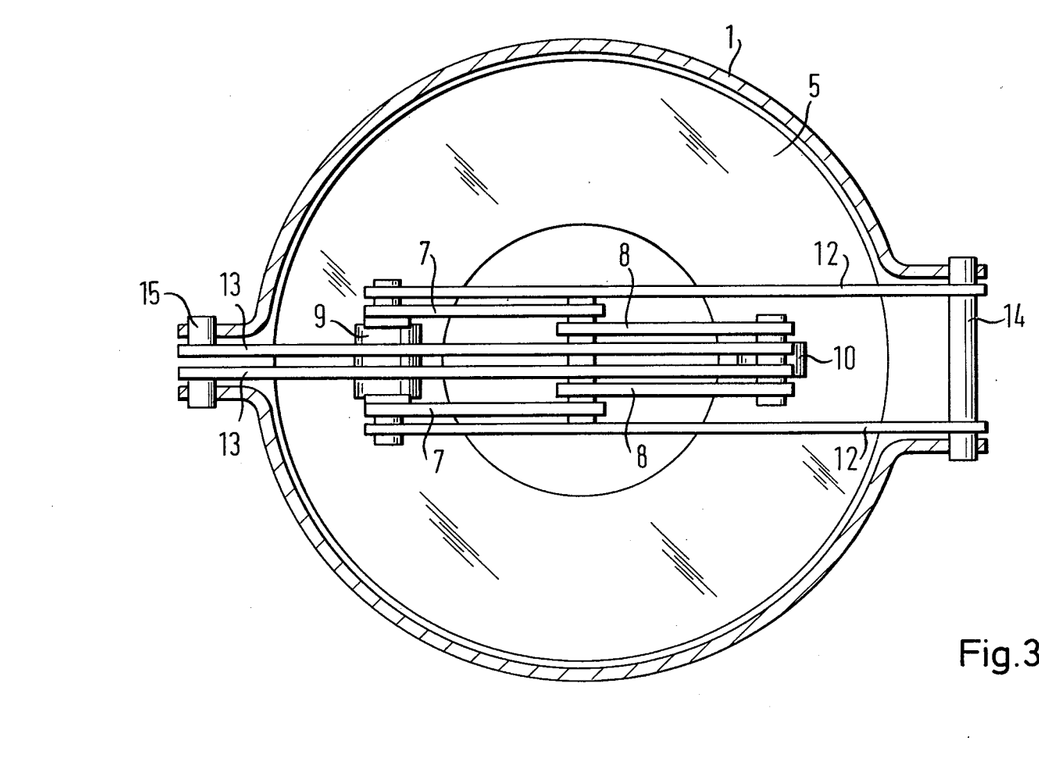
FIG. 3 is a sectional view of the same embodiment taken along line III—III of FIG. 1.
Figure 4:
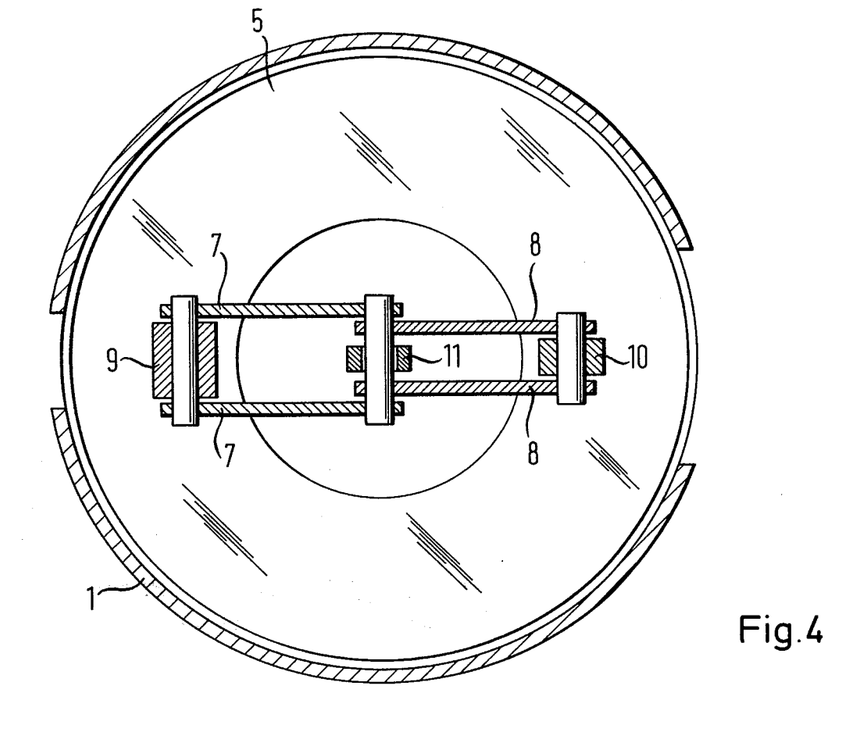
FIG. 4 is a sectional view of the same embodiment taken along line IV—IV of FIG. 1.
Figure 5:
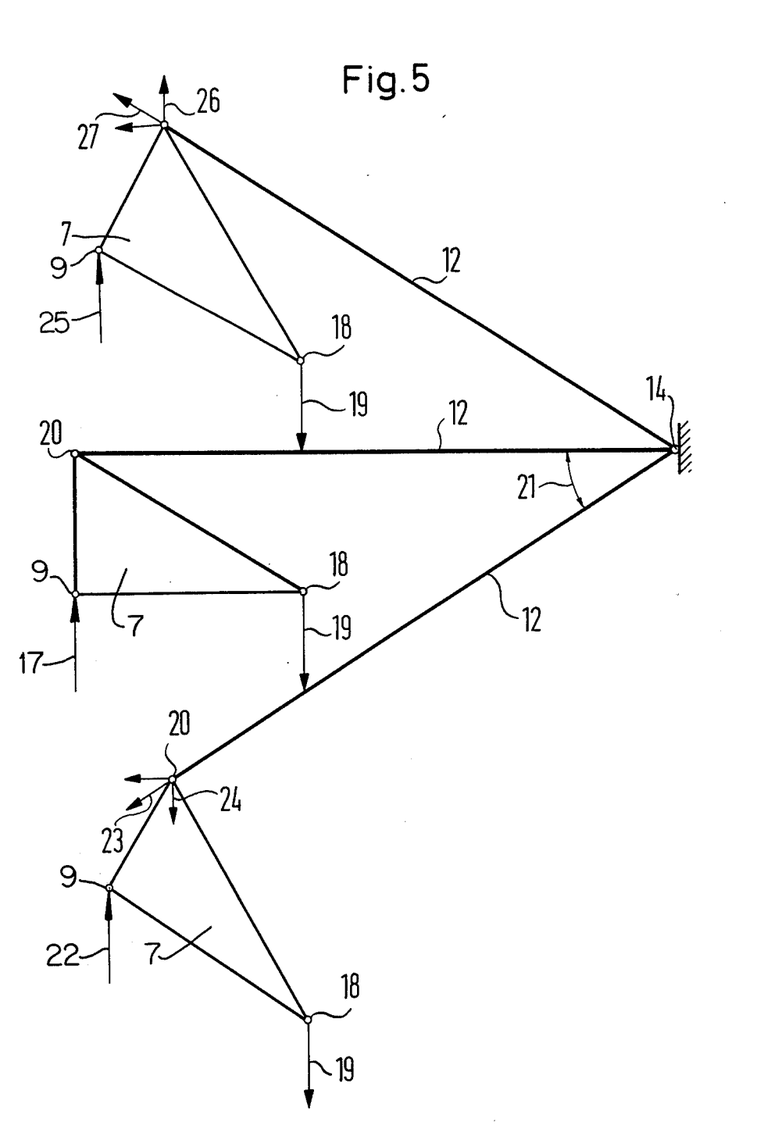
FIG. 5 is a schematic side elevational view of three different positions assumed by the same embodiment.

For an illustration of the mode of operation of the spring support illustrated in FIGS. 1–4, reference is made to FIG. 5 illustrating, in a simplified manner, the bell crank levers and the pivotal levers of one side in three different positions.

The central position in which the pivot lever 12 is oriented horizontally, is the neutral position. In this state of the spring support, the roller 9 of the bell crank lever 7 is exposed to one-half of the spring force 17, point 18 is exposed to one-half of the load 19 through the pull rod 11 (not illustrated in FIG. 5) and point 20 is exposed to a reaction force of the pivotal lever 12. This reaction force, however, is not illustrated because it has no vertical component which is the only component that would be of interest here.

In the central position the oppositely oriented forces 17 and 18 are in equilibrium since the spring support is set to its nominal value by a corresponding bias of the compression spring in such a manner that the latter is just capable of carrying the load without spring motion.

Assuming now that by virtue of a vertical change of position of the load a shift of the spring support occurs in the downward direction, the pivotal arm 12, together with the bell crank lever 7 is rotated downwardly through an angle 21. Simultaneously, the bell crank lever 7 executes a clockwise rotation, the course of which is determined by the fact that the point 20 progresses on the circular path described by the pivotal lever 12 and the point 18 moves along the vertical, always constant path of displacement of the pull rod 11. Accordingly, the roller 9 moves radially outwardly on the spring disc.

The immediate consequence of the above-described pivotal motion is that the compression spring is shortened and thus tensioned so that the one-half of the force 22 exerted thereby increases. At the same time, however, the reaction force 23 exerted by the pivotal lever 12 receives a vertical component 24 which opposes the increased spring force 22 in the direction of the load 19. Here, the counterforce 24 is equal to the product of the reaction force 23 and the sine of the pivot angle 21. It can be thus seen that with a proper dimensioning of the bell crank lever 7 and the pivotal lever 12, the magnitude of the counterforce 24, by means of the permissible setting range of the pull rod 11, can be given such a value that it just compensates for the setting path-dependent change of the force of the compression spring. This may be also observed from the upper pivotal position in FIG. 5 in which, considering the neutral position as a starting point, the spring force 25 drops, because of a relaxation of the spring, but is complemented by the vertical force component 26 of the then appearing reaction force 27.

Since the magnitude of the forces 24 or 26 in essence depend from the magnitude of the pivotal angle 21, it is apparent that the length of the pivotal lever 12 has a particular significance because, related to a certain path of the pull rod 11, it determines the magnitude of the pivotal angle 21. Further, with regard to the neutral position illustrated in FIG. 5, the ratio of bias of the compression spring to the length of the pivotal lever 12 and the ratio of the vertical distance between the pivotal lever 12 and the point 18 to the horizontal distance between the point 18 and the roller 9 were found to be significant. It was found that with regard to lowest possible errors and with regard to structural aspects, particularly good results can be achieved if these two ratios are in the same order of magnitude and are in general in the range of 1. Further, the vertical distance between the roller 9 and the point 20 also play a significant role, because as this distance increases, the error appearing during the excursion of the spring support decreases.

Figure 6:
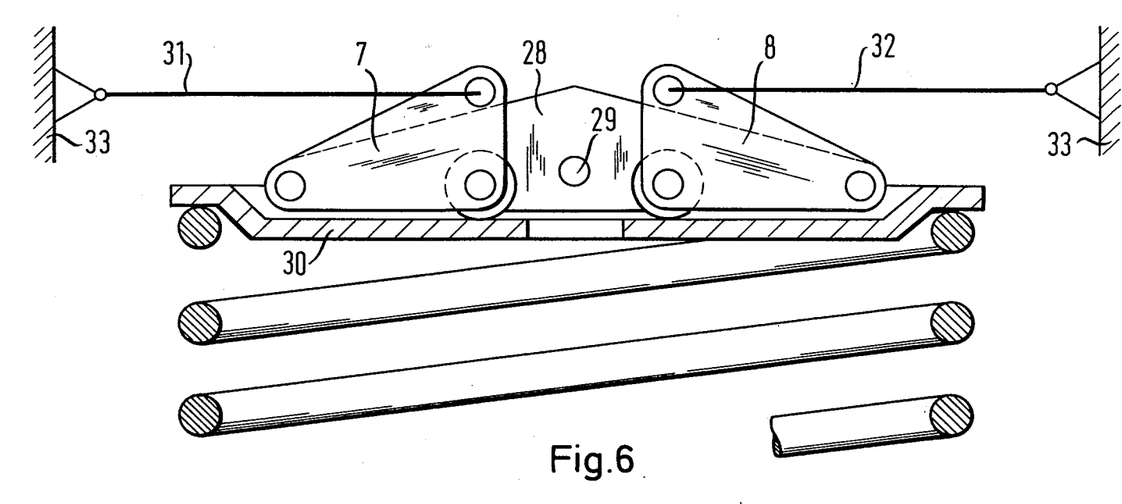
FIG. 6 is an axial sectional view of a modification of the same embodiment.

FIG. 6 illustrates, only in a partial representation, a modified structure of the spring support illustrated in FIGS. 1–4. The modification resides in that the bell crank levers 7 and 8 are turned around and their essentially radially extending arms are, at the respective ends, articulated to a bridge 28, to the mid portion of which there is pivotally secured, at 29, the pull rod, not shown. The free ends of the essentially vertically (axially) extending arms of the bell crank levers 7 and 8 are pivotally attached to respective pivotal levers 31 and 32 which, in turn, are articulated, at their respective other ends, to an adjacent portion of the housing 33.

Figure 7:
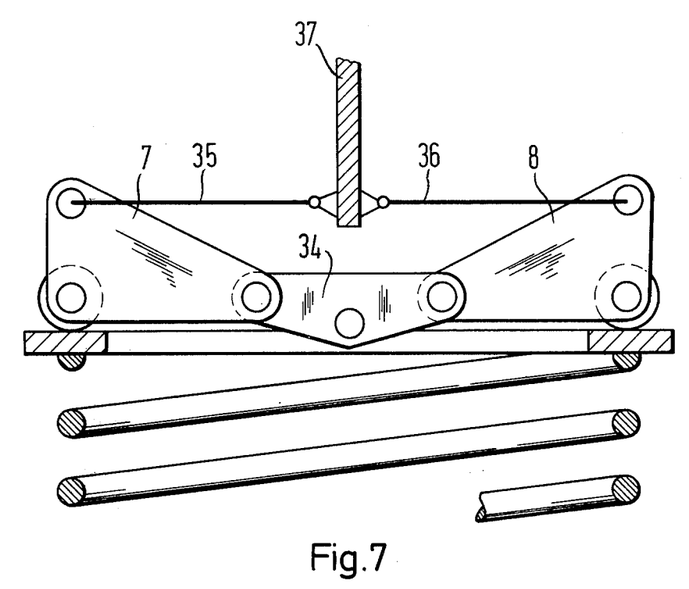
FIG. 7 is an axial sectional view of another modification of the same embodiment.

A further variant of the spring support according to FIGS. 1–4 is illustrated in FIG. 7. According to this embodiment, the bell crank levers 7 and 8 are radially urged away from one another and their horizontal free ends are interconnected by means of a bridge 34 to the mid portion of which there is articulated the pull rod not shown. The pivotal levers 35 and 36 extending from the respective free ends of the essentially vertically (axially) oriented arms of the bell crank levers 7 and 8 extend in the direction of one another and are articulated to a housing wall 37 extending in the middle of the spring support.

The embodiments illustrated in FIGS. 1–4, 6 and 7 offer various possibilities, particularly in giving different lengths to the pivotal levers 12, 13; 31, 32; and 35, 36, dependent upon the requirements regarding the compensation for the force variation of the compression spring appearing due to the excursion of the spring support. It is a non-variable feature here that the pivotal levers are capable of describing solely circular paths, so that compensating forces designated with 24 and 26 in FIG. 5 can follow only a sinusoidal function. In some cases this may lead to structural difficulties which may originate from the fact that the length of the pivotal levers may not be arbitrarily selected.

Figure 8:
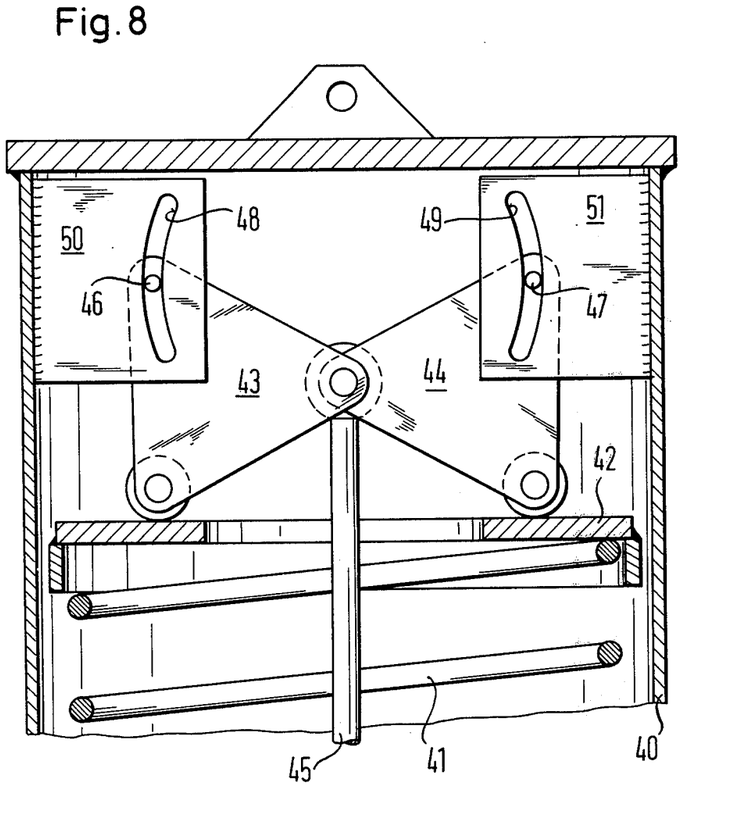
FIG. 8 is an axial sectional view of another preferred embodiment of the invention.

An embodiment which overcomes the above-discussed difficulties in a very simple manner is illustrated in FIG. 8. In a housing 40 there is disposed a compression spring 41 which carries a spring disc 42. The latter is engaged, in a manner already described, by bell crank levers 43 and 44 which are together centrally articulated to a pull rod 45.

The bell crank levers 43 and 44 have, differently from the earlier-described embodiments, at least one laterally projecting respective pin 46 and 47 each guided in an associated slot track 48 and 49 provided in respective plate members 50 and 51, each affixed to the housing 40. For a better understanding, the slot tracks 48 and 49 are shown as circular tracks as described in connection with the motion of the pivotal levers 12 and 13 in the embodiment illustrated in FIGS. 1–4. By this comparison it is seen that that tracks 48 and 49 have the same mode of operation as the previously described pivotal levers.

The slot tracks 48 and 49, however, have the advantage that, with regard to their course, they can be shaped between wide limits, so that the compensation forces designated at 24 and 26 in FIG. 5, yield throughout the permissible setting range of the spring supports, always exactly that magnitude which is required to establish equilibrium between load and support force carrying the same. Explaining this feature with a pictorial comparison, the course of the slot tracks 48 and 49 may correspond to the pivotal levers (shown in FIGS. 1–4) which vary their length in a stepless manner throughout the setting range of the spring support.

Figure 9:
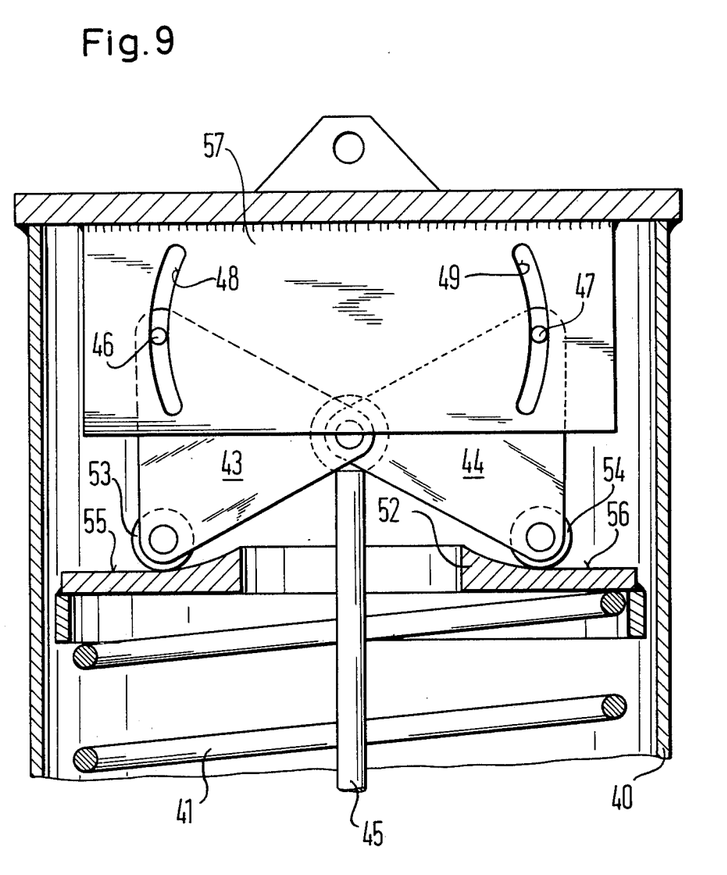
FIG. 9 is an axial sectional view of still another preferred embodiment of the invention.

Turning now to FIG. 9, there is illustrated a further embodiment of the invention which includes features that may be used alone or in combination with the previously described embodiments. For the sake of simplicity, the embodiment illustrated in FIG. 9 is in essence based on the structure of FIG. 8 wherein identically designated components perform identical functions. The only difference between the two embodiments is that according to the FIG. 9 structure, the plate members 50 and 51 of FIG. 8 are combined into a common plate member 57 which is affixed to the upper closure wall of the housing 40. This feature has the advantage that the reaction forces appearing at the slot tracks 48 and 49 mutually cancel one another without thereby placing the housing 40 under stress.

An additional feature is provided in the FIG. 9 embodiment, according to which the spring disc 52 has, on its upper face, curved tracks 55 and 56 cooperating, respectively, with the rollers 53 and 54 of the bell crank levers 43 and 44. By means of the tracks 55 and 56 the vertical length alteration of the compression spring 41 is affected relative to the vertical displacement of the pull rod 45. In the embodiment illustrated in FIG. 9 the curved tracks 55 and 56 are so designed that, related to the embodiment according to FIGS. 1–8, the vertical spring displacement is relatively decreased.

As it can be seen from the above description of the illustrated several embodiments, the invention makes possible to provide a spring support which has an essentially constant or even exactly constant support force and which, compared to known spring supports, has very small spatial requirements, yet, its assembly is simple and its operation is reliable.

It is apparent from the geometry of the embodiments, that the term "vertical" is equivalent to an orientation which is generally parallel to the longitudinal axis of the coil spring, whereas the term "horizontal" is equivalent to an orientation which is parallel to a radial plane (that is, a plane which is perpendicular to the coil axis) of the coil spring.

It will be understood that the above description of the present invention is susceptible to various modifications, changes and adaptations, and the same are intended to be comprehended within the meaning and range of equivalents of the appended claims.

What is claimed is:

1. In a spring support device including a coil spring having a longitudinal axis, one end supported by a stationary abutment and another end carrying a spring disc; at least two bell crank levers arranged on the spring disc symmetrically to the coil spring; fulcrum means slidably and pivotally supporting each bell crank lever on the spring disc; each bell crank lever having a first arm extending from the fulcrum means generally towards the axis of the coil spring; each bell crank lever having a second arm extending from the fulcrum means at an angle to the first arm; the first and second arms having an end remote from the fulcrum means; a longitudinally movable pull rod having a first end adapted to carry a load and a second end at least indirectly articulated to the end of each first arm; the improvement comprising guiding means for guiding said end of each said second arm in a stationary, arcuate path oriented generally along a line parallel to said axis.

2. A spring support device as defined in claim 1, wherein said spring support device has a neutral position; the second arm of each said bell crank levers extending substantially parallel to said axis in said neutral position.

3. A spring support device as defined in claim 1, including a housing accommodating said coil spring; said first end of said coil spring being supported by a housing part constituting said abutment.

4. A spring support device as defined in claim 1, further comprising a bridge articulated to said end of each said first arm of said bell crank levers, said second end of said pull rod being connected to said bridge.

5. A spring support device as defined in claim 1, further including means defining an opening in said spring disc for providing a passage therethrough for parts connected to said second end of said pull rod during displacement thereof.

6. A spring support device as defined in claim 1, wherein said guiding means includes pivotal levers, one associated with each said bell crank lever; each pivotal lever having a first end articulated to a stationary support and a second end articulated to said end of each said second arm of the associated bell crank lever.

7. A spring support device as defined in claim 6, wherein said spring support device has a neutral position; said pivotal levers being oriented parallel to a radial plane of said coil spring in said neutral position.

8. A spring support device as defined in claim 6, wherein said stationary support for any one pivotal lever is situated adjacent the bell crank lever associated with said any one pivotal lever.

9. A spring support device as defined in claim 6, wherein said stationary support is aligned with the path of displacement of said pull rod.

10. A spring support device as defined in claim 6, wherein said stationary support for any one pivotal lever is situated adjacent a bell crank lever associated with another one of said pivotal levers.

11. A spring support device as defined in claim 1, wherein said guiding means includes means defining stationary slot tracks extending adjacent each bell crank lever; and a pin attached to and laterally projecting from the second arm of each said bell crank lever and extending into the adjacent slot track.

12. A spring support device as defined in claim 11, wherein said spring support device has a neutral position; that portion of each slot track that engages the associated pin in said neutral position has a course extending substantially parallel to said axis.

13. A spring support device as defined in claim 11, wherein said means defining said stationary slot tracks is constituted by a sole plate member.

14. A spring support device as defined in claim 1, further comprising a radially extending and axially effective curved track provided on said spring disc; said fulcrum means being in engagement with said curved track.

* * * * *